US008299902B1

(12) United States Patent
Roka

(10) Patent No.: US 8,299,902 B1
(45) Date of Patent: Oct. 30, 2012

(54) ENSURING AN ALARM ACTIVATION OF A MOBILE COMMUNICATIONS DEVICE

(75) Inventor: Pujan Roka, Olathe, KS (US)

(73) Assignee: Sprint Communications Company L.P., Overland Park, KS (US)

(*) Notice: Subject to any disclaimer, the term of this patent is extended or adjusted under 35 U.S.C. 154(b) by 231 days.

(21) Appl. No.: 11/942,833

(22) Filed: Nov. 20, 2007

(51) Int. Cl.
G08B 1/00 (2006.01)

(52) U.S. Cl. ............ 340/309.16; 324/425; 320/137

(58) Field of Classification Search ............ 340/309.16, 340/500, 636.1–636.19, 636.2, 636.21; 324/425–434; 320/137
See application file for complete search history.

(56) References Cited

U.S. PATENT DOCUMENTS

| | | | | |
|---|---|---|---|---|
| 4,203,103 A * | 5/1980 | Osada et al. | ............ | 345/38 |
| 5,732,347 A * | 3/1998 | Bartle et al. | ............ | 455/421 |
| 6,157,169 A * | 12/2000 | Lee | ............ | 320/132 |
| 6,717,520 B1 * | 4/2004 | Dorenbosch | ............ | 340/636.1 |
| 7,528,577 B2 * | 5/2009 | Hara et al. | ............ | 320/132 |
| 2004/0203490 A1 * | 10/2004 | Kaplan | ............ | 455/90.1 |
| 2004/0266335 A1 * | 12/2004 | Usui et al. | ............ | 455/3.03 |
| 2007/0133879 A1 * | 6/2007 | Fukaya et al. | ............ | 382/190 |
| 2007/0205745 A1 * | 9/2007 | Chen et al. | ............ | 320/136 |
| 2007/0266447 A1 * | 11/2007 | Hollander | ............ | 726/34 |
| 2007/0282609 A1 * | 12/2007 | Okada et al. | ............ | 704/260 |
| 2008/0102807 A1 * | 5/2008 | Lee et al. | ............ | 455/418 |

FOREIGN PATENT DOCUMENTS

GB 2433612 A * 6/2007

* cited by examiner

Primary Examiner — George Bugg
Assistant Examiner — Edny Labbees

(57) ABSTRACT

Systems, products, and methods are disclosed for helping to ensure that an alarm of a mobile communications device is activated when desired. An illustrative method includes receiving an indication of a desired time that the alarm is intended to be activated, determining a power level of a power source that is powering the mobile communications device, determining whether the power level will provide sufficient power to the mobile communications device to enable it to activate the alarm at the desired time and, if so, then enabling the alarm to be set. Further, the power source could be monitored as the alarm-activation time approaches so that if variables change that might prevent the alarm from activating, then changes or preventive measures can be taken.

18 Claims, 4 Drawing Sheets

ENSURING AN ALARM ACTIVATION OF A MOBILE COMMUNICATIONS DEVICE

SUMMARY

Embodiments of the present invention are defined by the claims below. But summarily, embodiments provide a way to help ensure that an alarm of a mobile communications device is activated when desired and not prevented from doing so because of insufficient power.

In a first illustrative aspect, a method (or product capable of carrying out a method) to help ensure that an alarm of a mobile communications device is activated when desired includes receiving an indication of a desired time that the alarm is intended to be activated, determining a power level of a power source that is powering the mobile communications device, determining whether the power level will provide sufficient power to the mobile communications device to enable it to activate the alarm at the desired time and, if so, then enabling the alarm to be set.

In a second illustrative aspect a method (or product capable of carrying out the method) includes receiving input that indicates a set of attributes that define a desired time and manner of the alarm to be activated, evaluating a power source powering the mobile communications device to determine a current power level (though not necessarily directly interfacing with or inspecting the power source), referencing historical usage data and the current power level to make a determination of whether enough power remains in the power source to enable the alarm to be activated given the set of attributes and, if so, then enabling the alarm; but if not, then presenting one or more options to vary that if varied would enable the alarm to at least be activated at the time.

In a third illustrative aspect, a method (or product capable of carrying out the method) includes receiving an indication of a time that the alarm is to be activated, determining a power level of a power source that is powering the mobile communications device, and based on the power level, suppressing one or more functions of the mobile communications device to enable the alarm to be activated at the time.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
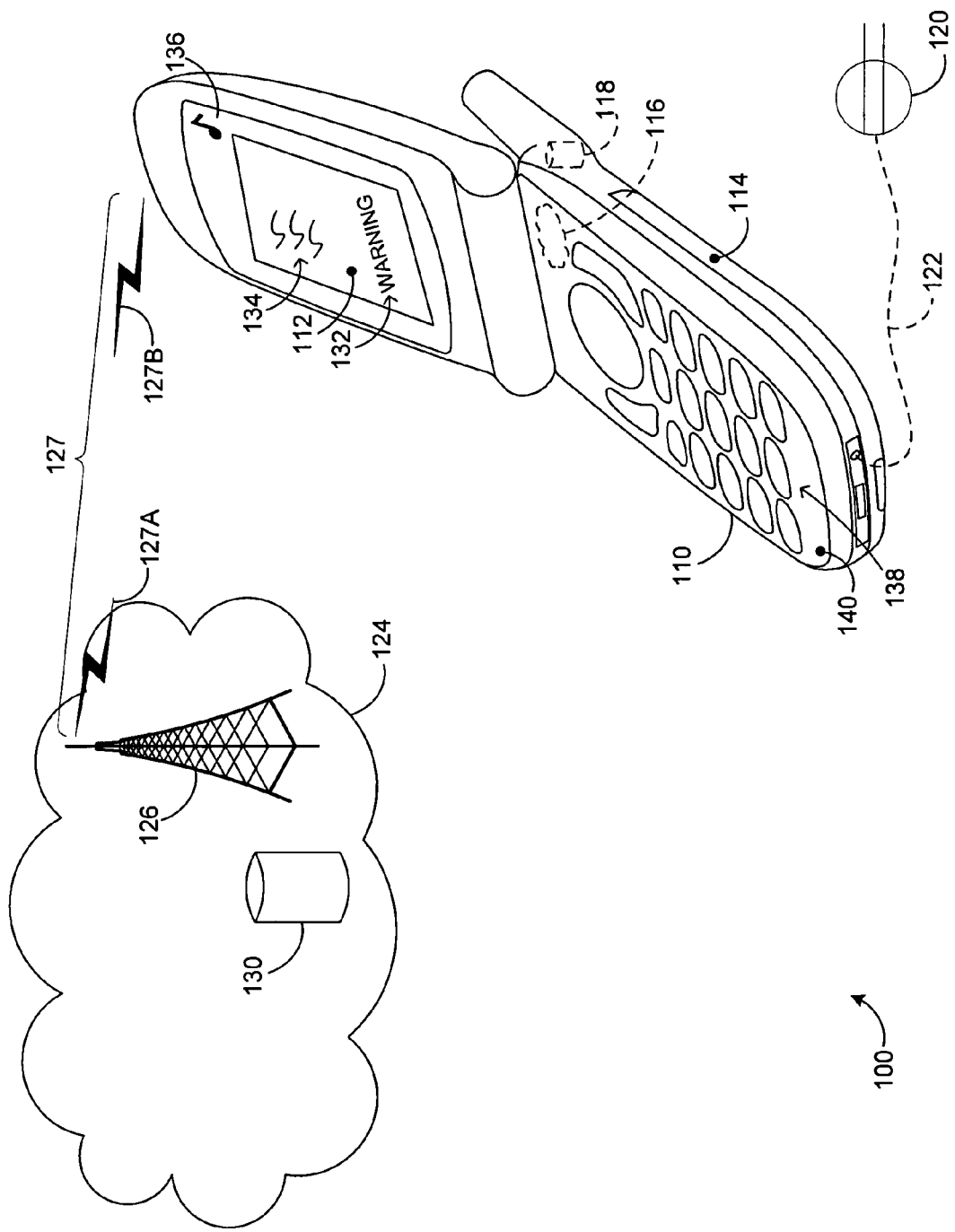
FIG. 1 depicts an illustrative operating environment suitable for practicing an embodiment of the present invention.

Turning now to FIG. 1, an illustrative operating environment suitable for practicing an embodiment of the present invention is provided and referenced generally by the numeral 100. A mobile communications device 110 includes a display 112, a power source or battery 114, and an application 116, which can take the form of the aforementioned computer-executable instructions in one embodiment. In one embodiment, a data store 118 is also included as part of mobile communications device 110. In other embodiments, application 116 and data store 118 can be combined into a single component. Mobile communications device 110 can be coupled to a secondary power source 120 by way of a power line or equivalent 122 in some embodiments. Secondary power source 122 can take the form of an electrical outlet or other charging mechanism that can be used to provide power to battery 114.

Mobile communications device 110 may take on a variety of forms. For example, mobile communications device 110 may be a mobile phone, a PDA, or other handheld device that is capable of communicating with a communications network, such as network 124. In some embodiments, network 124 includes an array of devices, which are not shown so as to not obstruct the more relevant aspects of the present invention. Components such as a base station or communications tower 126 can provide wireless connectivity 127 (shown by signals 127A and 127B) in some embodiments. Network 124 can also include a data store 130, which, in some embodiments, houses usage information associated with the way mobile communications device 110 is used. Communications network 124 may actually include multiple networks, as well as being a network of networks, but is shown in more simple form so as to not obstruct the present invention. Network 124 includes the capability of notifying mobile communications device 110 of a correct time. That is, network 124 can communicate with mobile communications device 110 to let mobile communications device 110 know of a correct time based on a specific time and/or geographic location of mobile communications device 110.

Makers of illustrative mobile communications devices are legion, but a few include, Research in Motion (currently makers of Blackberry® devices, which are mobile communications devices), Samsung, Sanyo, Nokia, Helio, Apple Computer, and the like. As will be explained in greater detail below, display 112 of mobile communications device 110 will, in some instances, present a warning message 132 as well as various options 134 for carrying out various functional aspects of embodiments of the present invention.

As previously mentioned in the summary, embodiments of the present invention provide a way to help ensure that an alarm of mobile communications device 110 is activated at a desired time. In some situations, a user may attempt to set an alarm but not realize that insufficient power remains to power the device to enable the alarm to go off (variously referred to herein as ("activate")) at the desired time and in some instances consistent with a set of attributes that have been associated with the alarm. Thus, at 9:00 p.m., a user may desire to wake up at 6:00 a.m. the next day.

A user may set an alarm (illustratively represented by numeral 136) to activate at 6:00 a.m. without realizing that a power level of battery 114 is insufficient to power device 110 for the length of time that needs to be powered in order for alarm 136 to activate at the desired time, 6:00 a.m. in this example. Accordingly, at some point during an interval leading up to 6:00 a.m., the power remaining in battery 114 would drop to so low a level that come 6:00 a.m., no alarm would be activated.

Figure 2:
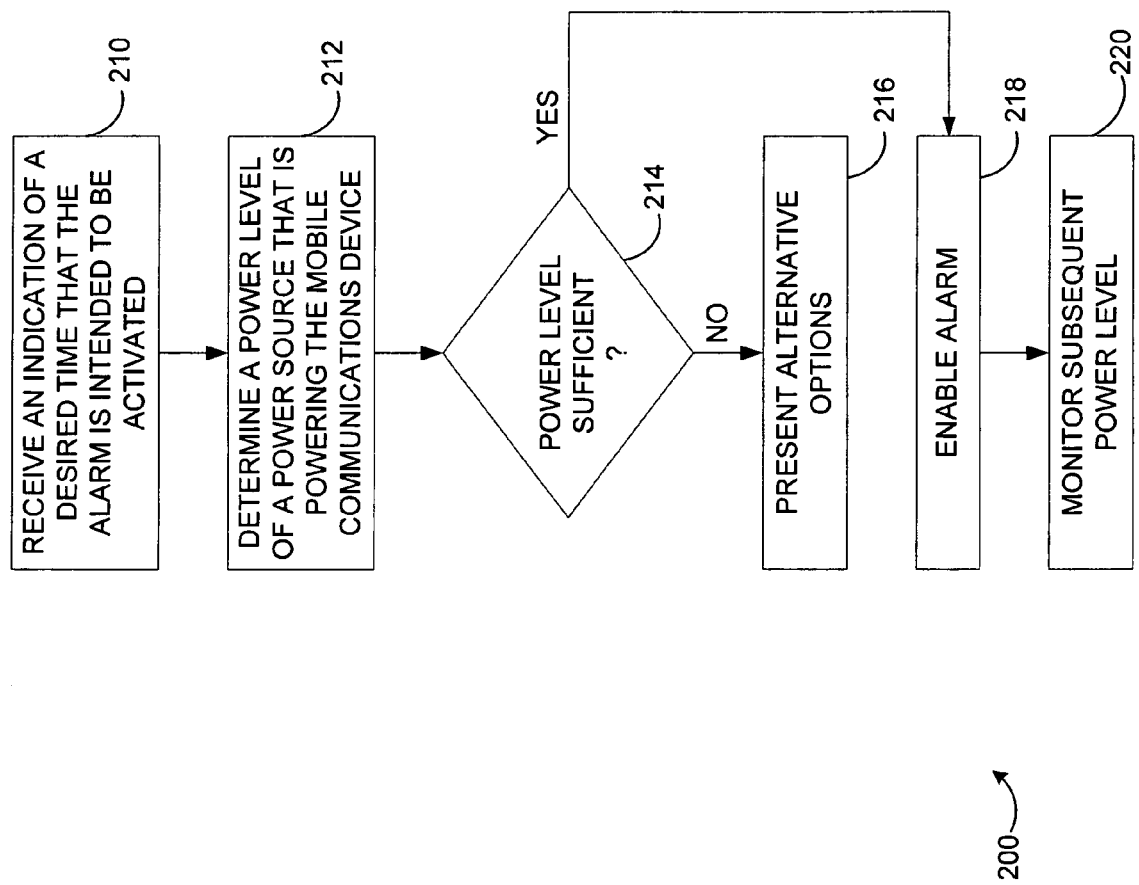
FIGS. 2-4 depict illustrative embodiments of helping to ensure that an alarm of a mobile communications device is activated according to various embodiments of the present invention.

An embodiment of the present invention provides a way to help ensure that alarm 136 activates at a desired time. With reference to FIG. 2 as well as FIG. 1, an illustrative method for helping to ensure that alarm 136 activates as desired will be described. At a step 210, mobile communications device 110 receives an indication of a desired time that alarm 136 is intended to be activated. This can happen a variety of ways and in a variety of times. The input need not occur in the same time frame with the other steps. In one embodiment, application 116 receives the indication of the desired time that alarm 136 is to be activated. A user can indicate a desired time in a variety of ways. For example, a user may key in a desired alarm-activation time by using the keys 138 of mobile communications device 110. In other embodiments, a user can speak into a microphone 140 of device 110 to indicate a desired alarm time. Thus, in other embodiments, wherein keys 138 are replaced by a touch screen (such as that of Apple's iPhone), such can be used to indicate a desired time that alarm 136 should be activated.

At a step 212, application 116 determines a power level of power source 114, which is powering mobile communications device 110. As mentioned, it may be the case that a user is charging device 110 using a secondary power source such as secondary source 120 by way of line 122. Line 122 is shown as dashed because it may only be connected to device 110 sporadically, such as when battery 114 needs to be charged. In some embodiments, even though device 110 is coupled to a secondary power source 120, application 116 still determines a power level of battery 114 and uses that power level in its analysis.

At a step 214, application 116 determines whether the current power level of battery 114 is sufficient to activate alarm 136 as requested by a user. In some embodiments, alarm 136 may be associated with a variety of attributes that indicate a manner by which it is to be activated.

For example, illustrative attributes include a vibrate indication that indicates that the alarm is to take the form of a vibration of mobile communications device 110, an audio indication that indicates that alarm 136 is to take the form of some type of audible alert. An audible alert may be a ring tone but may also be a song or any other audio rendering.

Another illustrative attribute associated with an alarm such as alarm 136 may include a visual indication that indicates that the alarm is to take the form of a visual attribute presentable by device 110, such as by way of display 112. The visual indication may indicate a desired visual representation to present, such as a video, picture, slide show, etc. to be presented in connection with alarm 136.

Another illustrative attribute of alarm 136 may include a volume or intensity level associated with the audio indication or the visual indication. For example, in the case of an audio indication, an attribute may indicate a volume level by which the audio will be rendered to have the audio played back at. In the case of a visual indication, a level of intensity can be received that indicates a level of brightness for example. An intensity level may also be associated with a vibrate indication. That is, mobile communications device 110 may vibrate at different levels, and an intensity indication would indicate with what level of intensity device 110 is to vibrate when alarm 136 is activated.

Another illustrative attribute that may be associated with alarm 136 includes an indication of a length of time that the alarm is to persist. In some embodiments, the length of time may, for example, be 10 seconds, or any other time measurement such as minutes for example, or even a continue-until-stop indication that indicates that the alarm is to remain in an activated state until it is deactivated. One way to deactivate the alarm is for a user to intervene and interact with the device so as to cause the alarm to deactivate or turn off. Another way to deactivate the alarm is for it to be remotely deactivated in one embodiment.

Another illustrative indication of an attribute that might be associated with alarm 136 includes a snooze indication. In this way, device 110 can be configured to activate alarm 136 at an initial time, and incident to receiving a subsequent command, such as a snooze command, the alarm may remain in an active state or persist for an interval of time.

As mentioned, at a step 214, application 116 determines whether sufficient power remains in power source 114 so as to enable alarm 136 to activate at the desired time. One aspect of determining whether the power level will provide sufficient power includes determining a required operation time in one embodiment. This required operation time is an amount of time between a current time, such as when the alarm is being set, and when it is to be activated.

Thus, for example, if an alarm is being set at 10:00 p.m. to be activated at 6:00 a.m. the next day, then a required operation time will be that amount of time between 6:00 a.m. the next day and 10:00 p.m. of the current day; namely, 8 hours. This assumes that things such as Daylight Savings Time or crossing time zones are not factors. These factors, however, can be considered by application 116 in some embodiments. In some embodiments, the calculation of the operation time was made possible because mobile communications device 110 knew of a current time.

That is, device 110 was aware of a currently accurate time. In some embodiments, this current time was able to be determined because the device at one time at least at some point received an indication of a correct time from communications network 124. As mentioned, communications network 124 includes a myriad of components, including one that is able to receive an indication or generate an indication of a correct time. Communications network 124 then, at least at some point, communicates this correct time to device 110. In some embodiments, this happens by way of wireless communications signals 127.

Communications signals 127 do not need to persist. That is, device 110 need not be in constant communication with communications network 124. At some point, device 110 may keep track of time on its own with, for example, an RTC (real time clock) chip or some other way. But in at least some embodiments, device 110 receives an indication of a correct time by way of communications network 124. In one embodiment, this is how device 110 can account for variables such as time zones and Daylight Savings Time. Namely, communications network 124 is aware of the geographic location of the device 110 either by triangulation or GPS for example, and thus, is able to identify a correct time zone of device 110. Similarly, network 124 is aware of Daylight Savings Time, and is able to accurately communicate a time to device 110 based on its awareness of values of such variables.

If insufficient power remains in battery 114 that would allow alarm 136 to activate at the desired time, and in some embodiments the desired manner, then at a step 216, application 116 facilitates presenting alternative options to a user. In some embodiments, these alternative options are presented by way of a user interface on display 112. These options are illustratively represented by numeral 134. But in other embodiments, such options may be presented by way of audio commands or even other touch-sensitive means such as vibrations to help people with visual impairments to be able to receive and understand feedback from device 110. For illustrative purposes, and to help simplify an explanation of an embodiment of the present invention, the remainder of this disclosure will describe the options in the context of options 134 that are presented on display 112 of device 110.

Thus, in one embodiment, application 116 facilitates automatically presenting a set of options that, if enacted, will enable the alarm to be activated at the desired time. Thus, these are options that make sacrifices in one area so as to allow functionality in another area based on either feedback or assumptions. These options 134 could include varying one or more of the set of attributes that were previously mentioned. But more than just modifying one or more of the set of attributes, options 134 could include varying other options.

For example, certain functional aspects of mobile communications device 110 could optionally be suppressed to allow alarm 136 to be activated at the time, and in some embodiments the matter, previously indicated. It may be the case that a user is not as much worried about the manner in which the alarm goes off only so long as the alarm actually goes off at the designated time. Application 116 can account for such a desire, and either suggest certain options or functionality to suppress or receive such indications from a user.

A first illustrative functional aspect of device 110 that might be suppressed so as to allow alarm 136 to be activated is requiring that a signal be maintained with communications network 124. In at least one normal mode of operation, communications device 110 may seek to be in persistent communication with network 124. This requires power. That is, a certain level of power is associated with maintaining a communications link with network 124. Accordingly, one functional aspect that could be suppressed, is to suppress as to not require that device 110 maintain communications with network 124. If such an option were enacted, then device 110 would be allowed to not maintain even a standby communications signal with network 124. This is sometimes referred to as "airplane mode."

In "airplane mode" a device severs communications with a network such as network 124. But, the severing need not be complete. That is, in some embodiments, device 110 may be able to conserve power by only periodically establishing a link with network 124. For example, perhaps device 110 reinitializes a communications link with network 124 every 30 minutes. During this time, communications device 110 may, for example, receive an updated time, receive an indication of voicemails, text messages, or otherwise update itself by receiving whatever data network 124 would have to communicate to device 110. Thus, one option of conserving power is to allow device 110 to not maintain persistent communications with network 124.

Somewhat similar to the previously mentioned suppressible option, another functional aspect includes not establishing a signal with communications network 124. Thus, for example, instead of indicating that device 110 is to not maintain a persistent connection with network 124, device 110 can be configured to never attempt to connect or reconnect to communications network 124. When device 110 is taken to a location that disrupts a signal with its communications network, that signal is generally attempted to be reestablished as quickly as possible. But, if device 110 is sufficiently insulated from network 124, then it may continue to attempt to reestablish a signal even though that is likely futile or at least undesired.

For example, if device 110 is taken to a cave, then battery 114 may be rapidly drained because of the power that is be expended in attempting to reestablish a communications link with network 124. Sometimes, for whatever reasons, device 110 may periodically lose connectivity with network 124. This may happen if a person is simply allowing the device to sit on a bedside table in a hotel room. Maintaining or reestablishing a communications signal with network 124 may not be a priority to a user. Thus, one option of the set of options 134 may be to indicate that if a connection is lost, then that connection to network 124 should not be reestablished, thereby conserving battery life that would otherwise be expended in connection with attempting to reestablish connectivity to network 124.

Another illustrative way that functionality could be suppressed according to an embodiment of the present invention is to prevent incoming calls. Normally, when device 110 receives an incoming call, some sort of notification is provided. Device 110 may vibrate or play a ring tone. Both of these functions require power from battery 114. Moreover, facilitating reception of the call itself takes power. If receiving calls are not a sufficiently high priority to a user, then that user may indicate that incoming calls are not to be allowed but, for example, sent directly to voicemail for subsequent retrieval.

Another illustrative way in which functionality can be suppressed is to prevent outgoing calls. A user may forget that he or she has set alarm 136. That could be the reason why alarm 136 was set in the first place. Some users are aware of the propensity to forget things. That being the case, a user may desire to at least have a warning presented during the interval leading up to alarm 136 being activated that warns a user to not make outgoing calls. This warning message may refresh a user's memory and serve as a reminder to not place the outgoing call, or at least keep it short. In other embodiments, a user may have to actually enter a code to place an outgoing call.

Another way in which functionality can be suppressed is to prevent media presentations from being presented. Illustrative media presentations include the playing of a video, a song, presenting a picture, playing a game, or any other type of rendering or presentation that consumes energy. Thus, a user may indicate that media presentations are not to be allowed during the interval leading up to the activation of alarm 136. In this way, if a user attempted to, for example, play a song or a video, device 110 would prevent that functionality from being exposed to a user. In other embodiments, a warning message may be provided, which the user may optionally override.

A final illustrative example of suppressing some functional aspect that would otherwise be available from device 110 is to prevent or restrict the operation of a backlight of a display of device 110. In this way, display 110 may be prevented from being used. In other embodiments, the level of intensity or brightness of the backlight of display 112 is restricted based on selecting this option.

These options as well as the aforementioned attributes could be modified automatically, done so according to a profile or set of default options, or by receiving input from a user. In some embodiments, if device 110 automatically selects certain functional aspects to be suppressed, it can do so in a variety of ways. In a first way, selection can be made based on a power level associated with the respective functional aspects. In this way, more power-hungry functions are suppressed first leaving less power-hungry functional aspects available for use. A second way is to restrict functionality based on importance of usage. For example, receiving incoming calls may be more important than being able to see caller ID information associated with the call. Thus, backlight or brightness functionality may be suppressed before disallowing incoming calls. Again, this can be user managed, automatically determined by device 110, or automatically determined by device 110 in light of receiving user input that indicates certain preferences associated with suppressing various functional aspects that would otherwise be available by way of device 110. In some embodiments, any interaction can be prevented with mobile communications device 110 until alarm 136 is activated. In another embodiment, all functional aspects of device 110 except those necessary to enable only the alarm to activate at the desired time can be suppressed.

With continuing reference to FIG. 2, if the power level determined in step 212 is determined to be sufficient to allow alarm 136 to be activated, then the alarm can be enabled at step 218. Though not required, but because the power level in battery 114 will continue to change over the interval leading up to the activation of alarm 136, in one embodiment, application 116 monitors subsequent power levels at a step 220. Thus, application 116 will monitor a subsequent power level of battery 114, and if applicable a secondary power source such as 120, during all or a portion of the time leading up to the activation of alarm 136. In some embodiments, power monitoring is continuous. In other embodiments, application 116 may periodically check a power level of battery 114 and recalculate how much power is needed to activate alarm 136.

In still further embodiments, application 136 may present a notification that alarm 136 is at risk of not activating because of intervening happenings that have occurred since the setting of alarm 136. Perhaps end callers have attempted to call the user associated with device 110, causing battering 114 to sufficiently drain below a threshold that would enable alarm 136 to be activated either at the present time and/or in the manner ascribed. Application 116 in some embodiments is intelligent enough to automatically prevent still further power drain if a user has indicated the desire for that to be the case. If the battery level drops dangerously low, then device 110 may present an audible alert, or a visual alert that prompts a user for action.

For example, in one embodiment, device 110 may prompt a user to plug device 110 into secondary power source 120. In other embodiments, device 110 may present a set of options 134 that a user can select to preserve what battery life remains so that alarm 136 will activate. In still further embodiments, application 116 may calculate an amount of time that if device 110 were powered off, then enough power would remain to allow alarm 136 to activate. Although a user may need to remember to power up the device, in one embodiment, device 110 could send a communication signal to network 124 that includes instructions to send back a wake-up signal that allows device 110 to wake up from a standby state.

Figure 3:
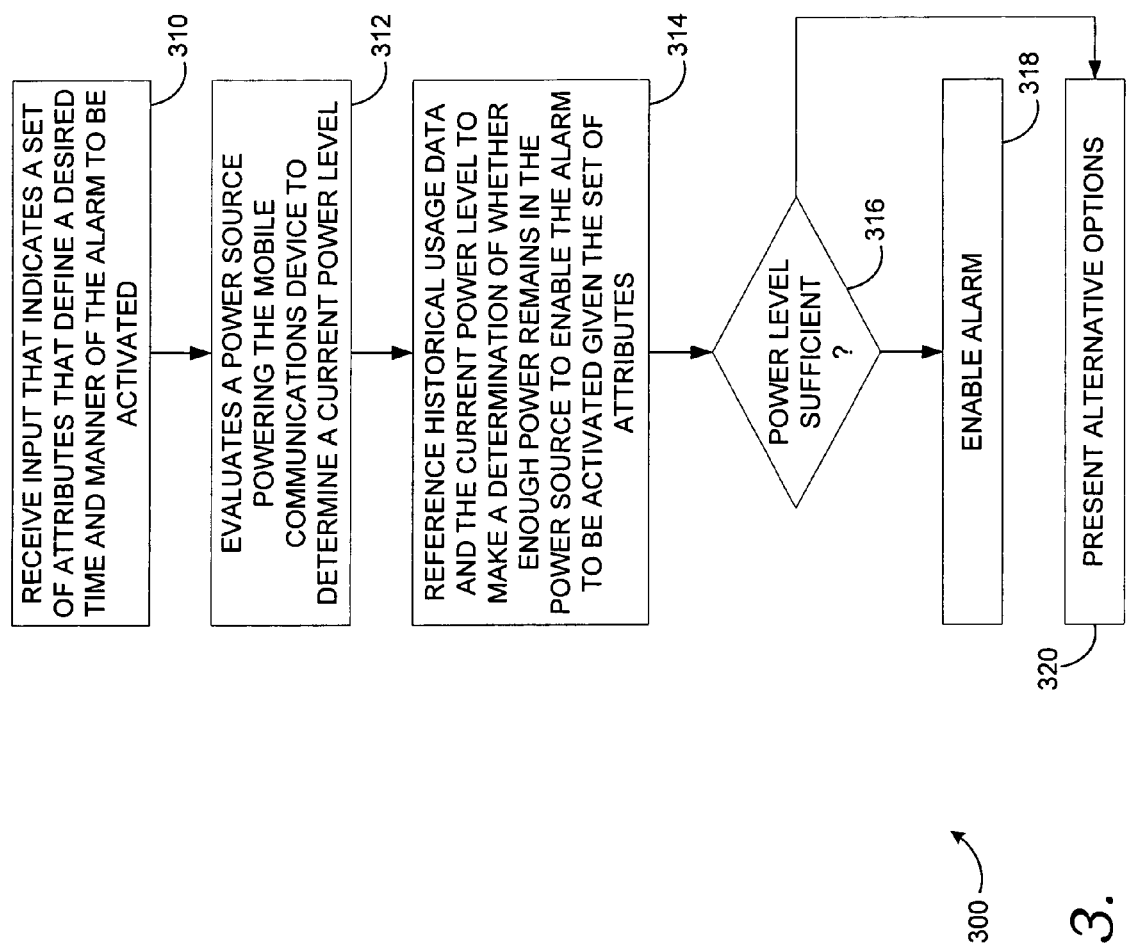

Turning now to FIG. 3, another illustrative embodiment of a method to help ensure than an alarm of device 110 activates at a desired time is presented in reference generally by the numeral 300. At a step 310, device 110 receives input that indicates a set of attributes that define a desired time and manner that alarm 136 is to be activated. As previously mentioned, the set of attributes may indicate one or more of a duration that the alarm is to persist, a volume level with which the alarm is to activate, or even a type of alarm such as a vibration, ring tone, song, video presentation, etc. At a step 312, application 116 evaluates a power source that is powering device 110 to determine a current power level. In some embodiments, application 116 itself determines a power level of, for example, battery 114. In other embodiments, a separate application may persistently monitor a power level of battery 114, wherein application 116 would reference such application to determine a power level of battery 114.

At a step 314, historical usage data is referenced and considered in connection with the current power level to make a determination of whether enough power remains in the power source to enable alarm 136 to be activated given a set of its attributes. Usage data refers to data that describes how mobile communications device 110 has been used over the past or is intended to be used in the future. For purpose of explanation, past usage data will be described.

In one embodiment, usage data can be stored throughout various memory components of device 110. These different components can be queried in real time to determine past usage data. In other embodiments, a separate data store such as data store 118 can house usage data locally. In still other embodiments, a database in network 124, such as database 130, can be used to store usage data associated with device 110. Illustrative usage data may include an amount of talk time, how often the Internet is used, how many bytes of data is communicated to and/or from device 110, a number of text messages or SMS messages communicated to or from device 110, how often device 110 is charged, the historical geographic ranges that device 110 travels, etc. The options are legion.

This historical usage data can be used somewhat blindly, or more intelligently in some embodiments. In one embodiment, an average of historical data is used. But in other embodiments, usage data that corresponds to an interval of time leading up to alarm 136 activating can be considered. For example, if alarm 136 is set to go at (activated) 6:00 a.m., then application 116 may intelligently consider historical usage data that leads up to prior instances of 6:00 a.m. For example, perhaps the twelve preceding hours over the last seven preceding days leading up to 6:00 a.m. If an afternoon reminder is set for 3:00 p.m., then perhaps application 116 will consider the previous four hours of the preceding seven days leading up to 3:00 p.m.

These setting can be default, user configured, or automatically set by application 116. For example, application 116 may know that a user uses device 110 at a peak time, for instance 5:00 p.m., every day. Thus, this measurement may serve as a benchmark or as a data point that is generally to be included.

The determination as to whether or not power remains is schematically represented in FIG. 3 by diamond 316 for referential purposes. In one embodiment, an aspect of determining whether sufficient power remains includes determining a required operation time, which is an amount of time between a current time (when the alarm is being set) and when it is to be activated. In one embodiment, this window provides a respective window with which to compare historical usage data. This window may be defined as the time leading up to and activation of alarm 136. All of the aforementioned options are equally applicable in this embodiment as well. Thus, if sufficient power exists, then alarm 136 is enabled at a step 318, but if insufficient power remains, then application 116 may present alternative options at a step 320. Presenting these alternative options has been previously discussed.

Figure 4:
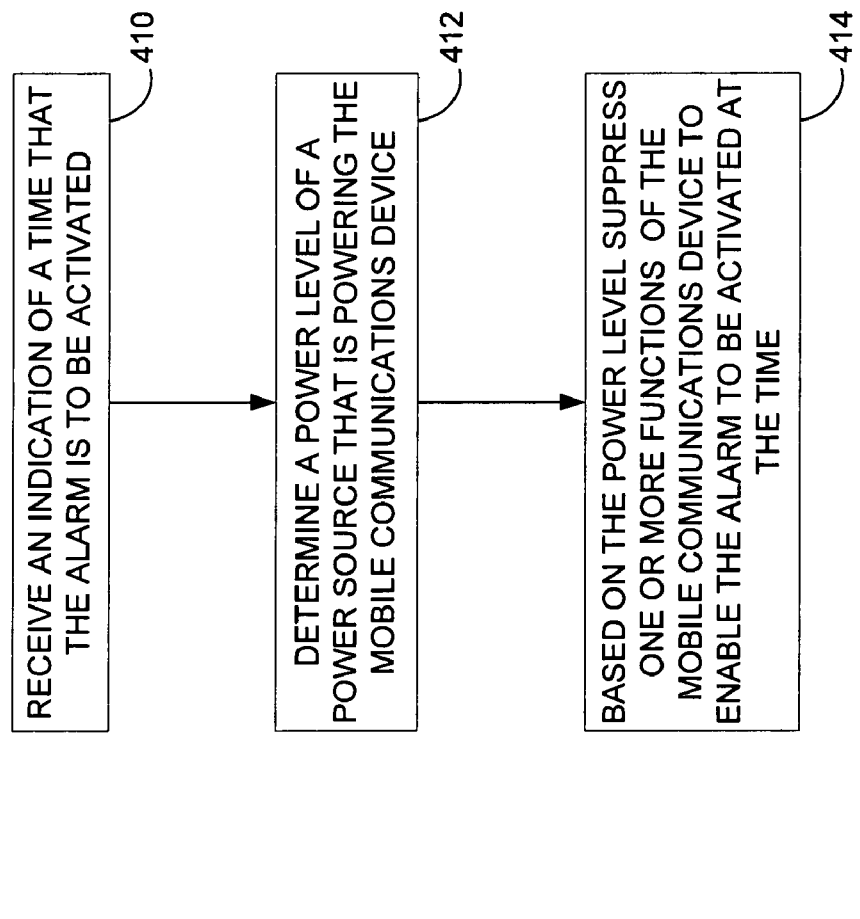

Turning now to FIG. 4, still another embodiment of helping to ensure that an alarm of a mobile communications devices is activated is provided and referenced generally by the number 400. At a step 410, an indication (which may include a variety of types of information) of a time that the alarm is to be activated is received. At a step 412, a power level of a power source that is powering mobile communication device (such as battery 114) is determined. Based on that power level, certain functional aspects of device 110 can be suppressed at a step 414. As previously mentioned, this suppressing of functional aspects can happen in a variety of ways. For example, a set of default settings may dictate an order or scheme or way that the different functional aspects are to be suppressed. In another embodiment, a set of setting defined by a user dictates how different functional aspects of device 110 are to be suppressed. In still another embodiment, an amount of power associated with maintaining certain of the one or more functions can be considered in connection with determining whether that function should be allowed to retain the possibility of occurring during an interval of time leading up to the alarm activating. In still another embodiment, as previously alluded to, a frequency of usage of certain of the different functions can be considered in making the determination as to whether its functionality should be preserved.

Thus, functionalities that are used more often than others will receive a priority over functionalities that are used less frequently. But in still other embodiments, those functionalities that are used more often might actually receive a lower priority with respect to other functional aspects that are used less often. In this latter scenario, because those functionalities, a random example being text messaging, are used so often, they operate as a significant battery drain. Thus, those functional aspects will not be allowed to occur until the alarm activates in one embodiment.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more computer-readable media having computer-executable instructions embodied thereon for performing a method to help ensure that an alarm of a mobile communications device is activated when desired, the method comprising:
   receiving an indication of a desired future time that the alarm is intended to be activated;
   determining a current power level of a power source that is powering the mobile communications device;
   determining a required operation time, which is an amount of time between a current time (when the alarm is being set) and when the alarm is intended to be activated;
   determining an amount of required power that will be required to activate the alarm at said future time, wherein the amount of required power is based at least on the required operation time;
   determining whether the current power level will provide the required power to the mobile communications device, thereby enabling it to activate the alarm at the desired future time; and
   if so, then enabling the alarm to be set, but
   if not, then preventing said alarm from being set.

2. The media of claim 1, wherein receiving the indication of the desired future time that the alarm is intended to be activated further includes receiving a set of attributes associated with the alarm.

3. The media of claim 2, wherein the set of attributes includes one or more of the following:
   a vibrate indication that indicates that the alarm is to take the form of a vibration of the mobile communications device;
   an audio indication that indicates that the alarm is to take the form of an audible alert;
   a visual indication that indicates that the alarm is to take the form of a visual attribute presented by the mobile communications device;
   a volume/intensity level associated with one or more of the vibrate, audio, or visual indications;
   a length-of-time that the alarm is to persist;
   a continue-until-stopped indication that indicates that the alarm is to remain in an activated state until manually deactivated; and
   a snooze indication.

4. The media of claim 1, wherein the power source is a battery, and determining a power level of the battery source includes determining a power level of the battery irrespective of whether the mobile communications device is coupled to another power source.

5. The media of claim 2, wherein the amount of required power is further based on the set of attributes associated with the alarm.

6. The media of claim 5, wherein the current time was able to be determined based on the mobile communications device having at some point received an indication of a correct time from a communications network with which the mobile communications device is capable of communicating with.

7. The media of claim 5, wherein when it is determined that the current power level will not provide the required power to enable the alarm to be activated at the desired future time, then automatically presenting a set of options selectable by a user that, when selected, enable the alarm to be activated at the desired future time, wherein the options conserve power by suppressing functional aspects of the mobile communications device.

8. The media of claim 7, wherein the set of options includes varying one or more of the set of attributes.

9. The media of claim 5, further comprising:
   monitoring a subsequent power level of the power source during at least a portion of the operation time; and
   presenting a notification that the alarm is at risk of not activating at the desired future time.

10. The media of claim 5, further comprising:
    monitoring a subsequent power level of the power source during at least a portion of the operation time; and
    automatically disabling one or more power-consuming operations so that the alarm will activate at least at the desired future time.

11. The media of claim 1, wherein the amount of required power is further based on historical usage data.

12. One or more computer-readable media having computer-executable instructions embodied thereon for performing a method to help ensure that an alarm of a mobile communications device is activated when desired, the method comprising:

receiving input that indicates a set of attributes that define a desired future time and manner of the alarm to be activated;

evaluating a power source powering the mobile communications device to determine a current power level;

determining a required operation time, which is an amount of time between a current time (when the alarm is being set) and when the alarm is intended to be activated;

referencing historical usage data and the current power level to make a determination of whether a required amount of power remains in the power source to enable the alarm to be activated at the desired future time, wherein the required amount of power is based at least on the set of attributes and the required operation time; and if so, then enabling the alarm; but if not, then presenting one or more options to vary that if varied would enable the alarm to at least be activated at the desired future time.

13. The media of claim 12, wherein the set of attributes indicate one or more of a duration, volume, and type of alarm.

14. The media of claim 12, wherein referencing historical usage data includes referencing usage data that describes usage of the mobile communications device over a past window of time.

15. The media of claim 14, wherein the past window of time corresponds to an interval of time leading up to the desired future time.

16. One or more computer-readable media having computer-executable instructions embodied thereon for performing a method to help ensure that an alarm of a mobile communications device is activated when desired, the method comprising:

receiving an indication of a desired future time that the alarm is to be activated;

determining a current power level of a power source that is powering the mobile communications device;

determining a required operation time, which is an amount of time between a current time (when the alarm is being set) and when the alarm is intended to be activated;

determining an amount of required power that will be required to activate the alarm at said future time, wherein the amount of required power is based at least on the required operation time;

determining whether the current power level will provide the required power to the mobile communications device, thereby enabling it to activate the alarm at the desired future time; and when it is determined that the current power level will not provide the required power, suppressing a function of the mobile communications device to conserve power such that the function is not allowed to occur until the alarm activates, thereby enabling the mobile communications device to activate the alarm at the desired future time.

17. The media of claim 16, wherein suppressing the function is performed automatically by the mobile communications device based on one or more of:

a set of default settings;

a set of settings defined by a user;

an amount of power associated with maintaining certain of the one or more functions; and a frequency of usage of certain of the one or more functions.

18. The media of claim 17 wherein suppressing the function includes:

allowing a signal to not be maintained with a communications network;

not establishing a signal with the communications network;

preventing incoming calls;

preventing outgoing calls;

preventing media presentations including one or more of a video, a song, or a picture;

preventing an operation of a backlight of a display of the mobile communications device;

preventing any interaction with the mobile communications device until the alarm activates; or disabling all functional aspects of the mobile communications device except those necessary to enable only the alarm to activate at the desired future time.

* * * * *